United States Patent [19]
Lehrer et al.

[11] 3,908,148
[45] Sept. 23, 1975

[54] ELECTRO-OPTICAL TRANSDUCER AND STORAGE TUBE

[75] Inventors: Norman B. Lehrer, Los Altos; David R. Peterson, Mountain View, both of Calif.

[73] Assignees: Watkins-Johnson Company, Palo Alto; Signetics Corporation, Sunnyvale, both of Calif.

[22] Filed: Nov. 18, 1974

[21] Appl. No.: 524,775

Related U.S. Application Data

[60] Division of Ser. No. 428,797, Dec. 27, 1973, which is a continuation-in-part of Ser. No. 188,099, Oct. 12, 1971.

[52] U.S. Cl. ................ 313/398; 313/483; 313/463
[51] Int. Cl.² .................... H01J 29/10; H01J 31/08
[58] Field of Search .......... 313/498, 499, 500, 505, 313/392, 398

[56] References Cited
UNITED STATES PATENTS

| | | | |
|---|---|---|---|
| 2,813,223 | 11/1957 | Kalfaian | 315/12 |
| 2,905,849 | 9/1959 | Kazan | 313/441 |
| 3,319,137 | 5/1967 | Braunstein | 357/6 |
| 3,344,300 | 9/1967 | Lehrer et al. | 313/463 |
| 3,491,433 | 1/1970 | Kawamura et al. | 29/570 |
| 3,500,142 | 3/1970 | Kahng | 357/23 |
| 3,548,236 | 12/1970 | Kiss | 313/465 |
| 3,560,784 | 2/1971 | Steele et al. | 313/441 |
| 3,681,638 | 8/1972 | Bleha et al. | 313/398 |

*Primary Examiner*—Robert Segal
*Attorney, Agent, or Firm*—Flehr, Hohbach, Test, Albritton & Herbert

[57] ABSTRACT

An electro-optical transducer and storage tube employing a bistable semiconductor switching means switched from one state to another responsive to input signals or information for controlling the application of electric fields to areas of a layer of material of the type which provides an optical output responsive to an applied electric field whereby to form an optical display of the signals or information and store the same until the bistable device is switched to its off state. A high density array of bistable switches provides high resolution of optical output, and high current density capability in the bistable switches provides high voltage level switching across the layer providing optical output for optimum brightness of the visual display.

10 Claims, 6 Drawing Figures

ELECTRO-OPTICAL TRANSDUCER AND STORAGE TUBE

This is a division of application Ser. No. 428,797 filed Dec. 27, 1973, which is a continuation-in-part application of prior Ser. No. 188,099, filed Oct. 12, 1971.

BACKGROUND OF THE INVENTION

This invention relates generally to electro-optical storage transducer and more particularly to an electro-optical storage transducer employing a semiconductor bistable switching means.

A storage tube or transducer is a device capable of providing a visual representation of stored electrical signals or information. In general, such tubes or devices have included an electron gun for generating an electron beam, means for deflecting the beam responsive to the signal or information and a target upon which the electron beam is focused.

In a cathode ray tube, the target assembly comprises fluorescent materials which give off light when bombarded by the electrons. Storage time is generally very short. Another type of cathode ray storage and display tube employs long persistence target materials which serve to store the information. Such a persistent target may comprise cascaded phosphors so that the luminescence of a short decay phosphor excites the photoluminescence of a long decay light emitting phosphor. The limitation of such screens can be simply understood when one considers the energy available for exciting the phosphor. The only source of energy is that imparted to the phosphor during excitation by the signal delivered with the electron beam. To achieve storage, this relatively small amount of energy delivered in a short time must be re-emitted for much longer periods of time. Even in the ideal case, this can occur only if the stored brightness level is substantially less than that achieved during excitation.

Another type of storage device is the so-called mesh structured storage tube. Storage is achieved through the addition of a storage mesh in front of the fluorescent screen. A storage dielectric is placed on the storage mesh and the signals are displayed and stored by the charge pattern which exists on the surface of the dielectric as a result of being bombarded by the electron beam. Thereafter, a flooding beam which serves as a second source of energy is modulated by the charge pattern on the storage mesh creating the stored image on the viewing screen. Such storage tubes are complicated to manufacture and complex circuitry is required to drive them. A recent improvement in mesh storage screen has been a storage tube in which the viewing screen and the mesh have been combined in a single mosaic pattern. In general, mesh storage tubes have poor resolution.

One approach to overcoming the resolution limitation of mesh structured storage tubes is to employ an electroluminescent-photoconductive target. In such a target, a layer of electroluminescent material is placed adjacent a layer of photoconductive material and the layers are sandwiched between two transparent electrodes. An optical input signal increases the conductivity of selected areas of the photoconductor, switching more voltage across the adjacent areas of the electroluminescent layer and causing it to luminesce and emit light. The electroluminescent layer remains lit after the input signal ceases because light from the electroluminescent layer feeds back to the photoconductor maintaining its conductivity. This type of tube is limited in that the response time of photoconductors is relatively long and the light feedback spreads giving degradation of resolution.

An approach to overcoming the problem associated with the use of feedback to achieve storage is to employ a structure which exhibits field-sustained conductivity. Field-sustained conductivity is the ability of a substance which is normally insulating to become conductive when excited by light or an electron beam and to retain the increased conductivity, after the excitation has ceased, as long as an electric field is applied to the substance. A momentary removal or reversal of the electric field restores the material to its pre-excited insulating condition. Cadmium selenide powder has been used as a material exhibiting field-sustained conductivity. Because of the thickness of the powder employed, the powder is generally photoexcited. Field-sustained conductivity has also been reported in cadmium sulphide films and in layers comprising mixtures of arsenic and selenium on which are deposited layers of antimony trisulphide. When these provided materials as a class are optically excited, the response time is relatively long. In many applications, short response times are required.

In general, the prior art devices are either limited with regard to their storage capabilities or with regard to their resolution capabilities. All prior art devices have limited frequency response.

OBJECTS AND SUMMARY OF THE INVENTION

It is an object of the present invention to provide an improved electronically generated and controlled stored display.

It is a further object of the present invention to provide a high resolution electro-optical transducer.

It is another object of the present invention to provide an electro-optical transducer which is simple to manufacture and which requires simple circuitry for operation.

It is an object of the present invention to provide an electro-optical transducer switching high voltage across the display for optimum brightness in the stored display.

It is still a further object of the present invention to provide an electro-optical transducer and display device which makes possible simultaneous prosentation of stored and non-stored information.

It is a further object of the present invention to provide an electro-optical transducer which has fast response time.

It is a further object of the present invention to provide an electro-optical transducer which can utilize electric field controlled light valve materials of the type which cannot be used in vacuum.

The foregoing and other objects of the invention are achieved by an electro-optical transducer comprising a bistable switching layer having first and second surfaces, at least a portion of said bistable layer switching responsive to signals applied to the first surface whereby the conductivity between said first and second surfaces at said portion switches from a low value to a high value and maintains a high value as long as an electric field is applied between the surfaces. A layer of display material provides a visible display responsive to an applied electrical field and cooperates with the other surface of said bistable switching layer. Conductive means form ohmic contact with the outer surfaces of the bistable switch and display material layer assembly whereby voltages as high as 200 volts may be applied across the entire assembly to sustain the high conductivity and to provide the intense electric field for improved brightness in said display material.

DESCRIPTION OF THE PREFERRED EMBODIMENTS

Figure 1:
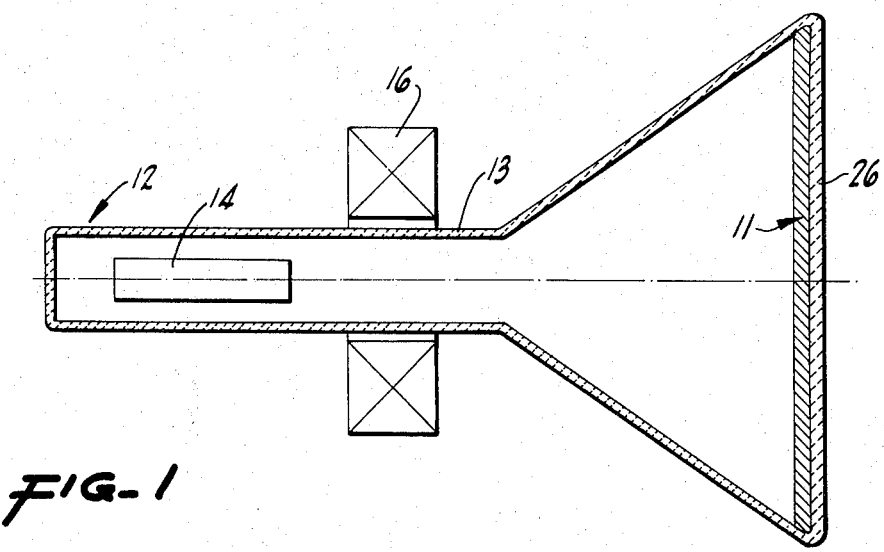
FIG. 1 is an elevational view in schematic form of a storage device employing an electro-optical transducer and storage means in accordance with the present invention.

As shown in FIG. 1, the electro-optical transducer and storage means 11 is incorporated as the target in a storage tube 12. The storage tube includes an envelope 13 with an electron gun 14 disposed at one end of the envelope and serving to project an electron beam towards the target 11 disposed at the other end. Magnetic or electrostatic deflection means control the trajectory of the beam and its point of impingement on the target 11. By way of illustration, magnetic deflection means 16 are shown surrounding the neck of the tube adjacent the electron gun.

The beam strikes the target and forms traces which correspond to the signal information carried as intensity modulation of the beam and/or applied to the deflection means 16. In accordance with the present invention, the display may be stored for a selected period of time to permit studying, photographing, viewing and the like.

Figure 3:
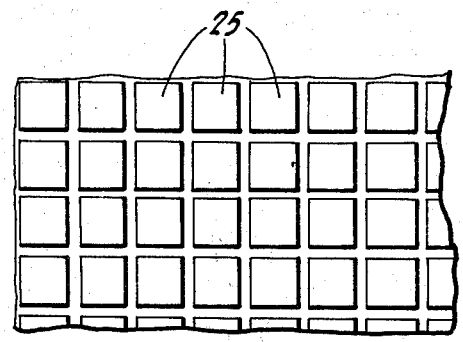
FIG. 3 is a sectional view taken along the line 3—3 of FIG. 2.

The target 11 comprises a plurality of layers of material. The target shown in FIGS. 2 and 3 comprises a thin silicon wafer or layer 21 of the N-type material. Although single crystal silicon is the preferred material, polycrystalline silicon can be utilized. One face of the layer is provided with an ohmic contact layer 22 which forms a common electrode for the switching device. The common electrode is preferably made from aluminum 1000 Angstroms to 4000 Angstroms thick when electron beam excitation of the target is employed. For optical excitation of the target, semi-transparent aluminum films between 400 Angstroms and 1000 Angstroms thick are satisfactory. It is also, of course, possible to utilize other transparent conductive film such as thin transparent gold films. In addition, it is possible to form a conductive contact by providing a thin surface layer of highly doped (N++) silicon.

The thickness of the semiconductor body or wafer is of some importance. It should be thick enough to accommodate the full width of the depletion layer which is formed in the switching device. As is well known to those skilled in the art, the resistivity determines the width of the depletion layer which, in turn, determines the thickness required for the wafer 21. In certain applications, it may be desirable to illuminate the device from the silicon side, in which case it would be desirable that the depletion layer extend all the way through the bulk of the silicon layer 21. In such an application employing 6 – 9 ohm cm. material, the semiconductor layer would be 20 to 40 microns for example whereas for 1 ohm cm. material, the thickness would be quite thin, in the order of 2 microns.

The 6 to 9 ohm centimeter N type silicon material can be utilized for switching thresholds in the area of 150 volts. Lower threshold voltages require lower resistivity N type silicon. For example, 1 ohm centimeter as required for a 20 volt threshold.

The other surface of the layer 21 is provided with a layer 23 of suitable dielectric such as silicon dioxide which serves as a barrier layer. Such a layer can be thermally grown or can be deposited. When the layer is thermally grown, it is grown in an oxidizing atmosphere in a furnace. For example, a layer of suitable thickness can be formed by placing the wafer in a furnace for approximately one hour in a dry oxygen atmosphere at a temperature of approximately 650°C. The layer 23 may have a thickness ranging from 5 to 50 Angstroms and typically will have a thickness of 25 Angstroms. The layer 23 serves as a tunneling barrier.

A layer 24 is formed on the surface of the oxide or glass layer. This layer is preferably of tantalum oxide and has a thickness ranging from 200 to 2000 Angstroms. The tantalum oxide can be formed in a suitable manner such as by vapor pyrolysis of pentaethyltantalate. Other materials may be utilized for obtaining tantalum oxide as, for example, chloride compounds as well as other organic compounds. The other surface of the tantalum layer 24, in the preferred embodiment, is provided with elemental contacts or electrodes 25. The bistable switch therefore includes the silicon layer 21 the silicon dioxide layer 23, the tantalum dioxide layer 24 and the aluminum elements 25.

The elemental electrodes 25 may be formed of aluminum and may be in the form of a high density array of small areas. These can be conveniently made, for example, by evaporating aluminum through high pitch meshes onto the surface. A 1000 × 1000/inch mesh will provide resolution of 1000 lines per inch, for example. It should be noted that the unaided eye is capable of resolving about 200 lines per inch. Each of the elemental contacts 25 together with the adjacent layers and common electrode 22 form a plurality of diodes which exhibit rectification effects. When the elemental contacts 25 are negative with respect to the silicon base 21, the diode is in the reverse bias condition. In the absence of excitation, the current is quite low and this can be designated as the low conductivity state. When the diode, in the low conductivity state, is excited by light, electron beam or a voltage pulse, the conductivity will increase by several orders of magnitude. If the excitation energy is sufficient and the applied d.c. voltage 31 sufficiently high, then this low conductivity state is maintained or stored for each of the diodes after the excitation ceases, but as long as the applied voltage 31 is maintained. If the magnitude of the applied potential 31 is less than the critical potential, the diode will return to its low conductivity state. Similar effects can be achieved with a.c. voltages if the a.c. frequency is high enough to prevent return of the diode to its low conductivity state. In practice, a 60 cycle per second voltage of sufficient amplitude has been found sufficient to maintain the high conductivity state. In either the a.c. or d.c. case, the diodes can be returned to the low conductivity state by momentarily removing the voltage (field applied across the diode). Large scale arrays of these silicon memory elements or diodes can be used to store information which has been read in by light, electron beam or voltage pulses. A complete description of solid state bistable switching devices and method of manufacturing the same is set forth in copending application Ser. No. 160,441, filed July 7, 1971, which has now issued as U.S. Letters Pat. No. 3,758,797.

Figure 2:
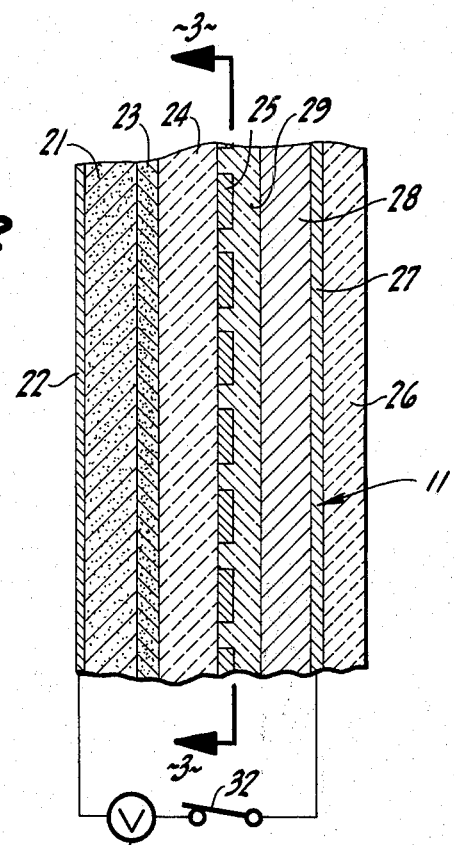
FIG. 2 is an enlarged sectional view of a portion of an electro-optical storage means shown in FIG. 1.

The bistable switch exhibits diode like characteristics with the forward direction occurring if the elemental contacts 25 of FIG. 2 are positive. A bistable switching characteristic between a low and high conductance state is observed when reverse bias is applied. Switching from the low to the high conductance state can be initiated by supplying a signal to the device which may be either an electrical or a light signal when either of the signals exceeds either a threshold voltage or illuminates the device under appropriate bias. Elemental contacts 25 define areas of the device in which they serve as single elements of a capacitor with the tantalum oxide layer 24 serving as the dielectric for the capacitor. During avalanche, or the high conductance state, the tantalum oxide layer 24 is capable of carrying a significant current without suffering thermal destruction. The combination of the silicon dioxide layer 23 and the tantalum oxide layer 24 appears to provide layer 23 and the tantalum oxide layer 24 appears to provide the storage screen described herein with the capability of switching higher voltages for application across the electroluminescent phosphor layer 28 than any other known combination. Thus switching of voltages up to 200 volts may be provided within the combination of layers shown in FIGS. 2, 4, 5 and 6 without such power dissipation in any layer as to cause the thermal destruction mentioned above. A high voltage bistable switch is presented which provides the probability of much brighter storage tube display than may be shown by different configurations due to the higher voltages which may be switched across the visual display material.

In accordance with one embodiment of the present invention, the diodes are excited by an electron beam impinging on the silicon layer 21 through the transparent electrode 22 whereby discrete ones of the bistable semiconductor devices, corresponding to each of the elemental areas 25 are triggered into their excited state and maintained in such state by the application of a voltage of sufficient magnitude.

Referring again to FIGS. 1 and 2, the glass face plate 26 of the envelope is employed to support the bistable semiconductor switching structure enclosed within the vacuum envelope 13 of the tube. An optically transparent conductive coating 27 is deposited on the inside face of the face plate 26 and serves as the second electrode for the electro-optical transducer of the present invention. An electroluminescent phosphor 28 is carried by the conductive coating 27. An opaque insulating layer 29 is deposited between the bistable switching device and the electroluminescent layer 28. Such layer 29 may comprise carbon black, stannous sulphide or the like insulating material. The opaque insulating layer 29 is provided to minimize feedback of light from the electroluminescent phosphor 28 to the silicon wafer 21. However, in certain instances where low intensity levels are provided, there is insufficient light to have any effect upon the bistable switching device and no such layer is required. Also, as will be presently described in an array where the silicon 21 of the bistable switching device is disposed adjacent to the electroluminescent material 28, feedback effects can be overcome by using a silicon layer 21 having substantial thickness whereby the depletion layer does not penetrate through the silicon.

The driving voltage 31 for the device is connected between the common electrode 22 and the optically transparent coating 27. A switch 32 is provided for controlling application of the voltage across the transducer.

As previously described, the voltage 31 applied to the bistable switching device may be a.c. or d.c. Consequently, the electroluminescent phosphor 28 is selected to be responsive to d.c. or a.c. fields. The amplitude of the voltage 31 is selected whereby the applied voltage 31 maintains high conductivity of the bistable switching device after once being switched to a high conductivity state considering the voltage drops across the remainder of the transducer.

The cathode of the writing gun may be operating near ground potential as is commonly done with cathode ray tubes. Then the circuit controlling the target or screen must be biased at a high 10 to 20 kv positive potential to provide electron beam acceleration. Alternately, the circuit driving the target may be referenced to ground and the cathode of the electron tube operated at high negative potential.

When the screen voltage 31 is first applied in the absence of excitation, the silicon memory elements, or bistable switches, are in the unexcited or low conductivity state. The electron beam can then be used to scan the target in either raster or random fashion with its grid modulated in accordance with the signals to be stored and the beam deflected in accordance therewith. When the electron beam strikes the screen with sufficient energy, the corresponding elements of the high density array of bistable switches will be triggered into high conductivity states turning on the corresponding regions of the electroluminescent phosphor 28 since the series conductivity in these phosphor regions is reduced comparatively and sufficient voltage is now applied across the electroluminescent layer 28 to cause the same to produce luminescence or bright visible light. The bistable storage elements will keep these elements turned on when the beam moves or is turned off. Thus, the electron beam can be used to write a true bistable or so called "black and white" presentation on the screen. This display will exist indefinitely without fadeout as long as the applied voltage 31 is maintained. It can be erased at any time by momentarily removing the applied voltage 31.

It should be noted that if the energy supplied by the electron beam during optical excitation is insufficient to cause the silicon elements to switch completely into the high conductivity state, it still can cause partial switching which will cause the electroluminescent layer 28 to light up but only as long as excitation is present. This mode of operation can be used for the presentation of non-stored or cursor information either in combination with stored information or by itself. Thus, a stored display may be provided and then with a second electron gun (not shown) having a beam with insufficient energy or with a projected light beam, a background grid or other background information can be supplied to the screen as cursor information.

If an optical window is provided in the tube 12 and the common electrode 22 is fabricated from aluminum thin enough to pass light and electron beams, then it is possible to present either stored or cursor information which has been generated optically as well as electron beam generated information.

Figure 4:
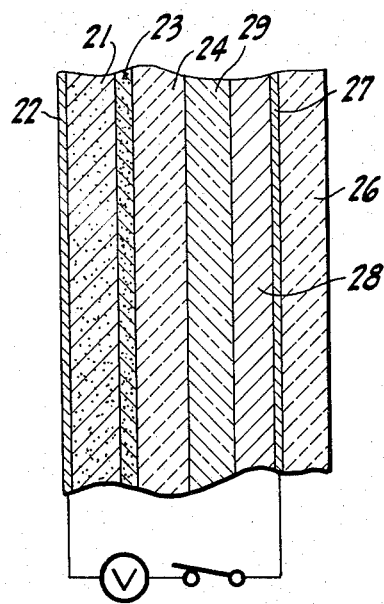
FIG. 4 is an enlarged sectional view of a portion of another electro-optical transducer and storage means in accordance with the present invention.

An alternative embodiment of the target is shown in FIG. 4 in which the elemental contacts 25 have been removed and the tantalum oxide layer 24 is in direct contact with the opaque layer 29. Like reference numerals have been applied to like parts. The sharpness of the image may be slightly degraded because of spreading effects. However, the bistable switching device will respond to excitation to provide areas or regions of low conductivity adjacent the electroluminescent layer 28 to form a display.

Figure 5:
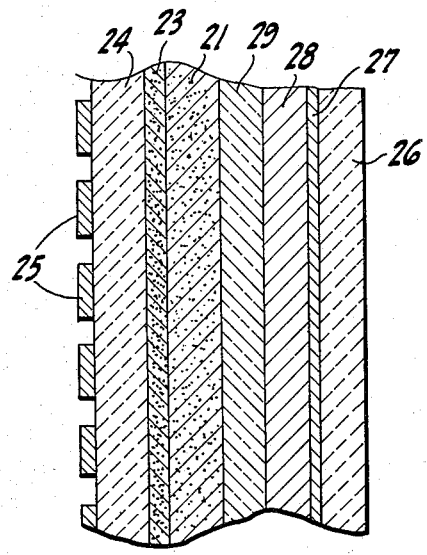
FIG. 5 is an enlarged sectional view of a portion of still another electro-optical transducer and storage means in accordance with the present invention.

In FIG. 5, the target of FIG. 2 is shown with the bistable switching device reoriented whereby the electron beam or light beam strikes transparent elemental contacts 25 to trigger the device. Like reference numerals have been applied to the parts corresponding to those of FIGS. 1–3. The operation of the device is as previously described with the difference that the polarity of the d.c. voltage applied between the conductive layer 27 on the face plate 26 and the common electrode 22 is reversed.

Certain substances and compounds exhibit reversible color changes when subjected to applied electric fields. For example, electrochromic materials are thin films which are normally clear. They become opaque when an electric field of particular polarity is applied to them for a short period of time. Restoration to the clear state is accomplished by applying a field of opposite polarity for an equivalent period of time. Modulation of these light valve substances on an elemental basis can produce high contrast displays for use in bright environments or they may be used to project large area displays.

Electron beams would be an excellent means of addressing these materials. Two problems immediately become evident. One is that these light valve materials generally cannot be enclosed in a vacuum. The second is that for many displays the available electron beam dwell time per resolution element is measured in fractions of a microsecond while the response time of the light valve material is measured in seconds.

Figure 6:
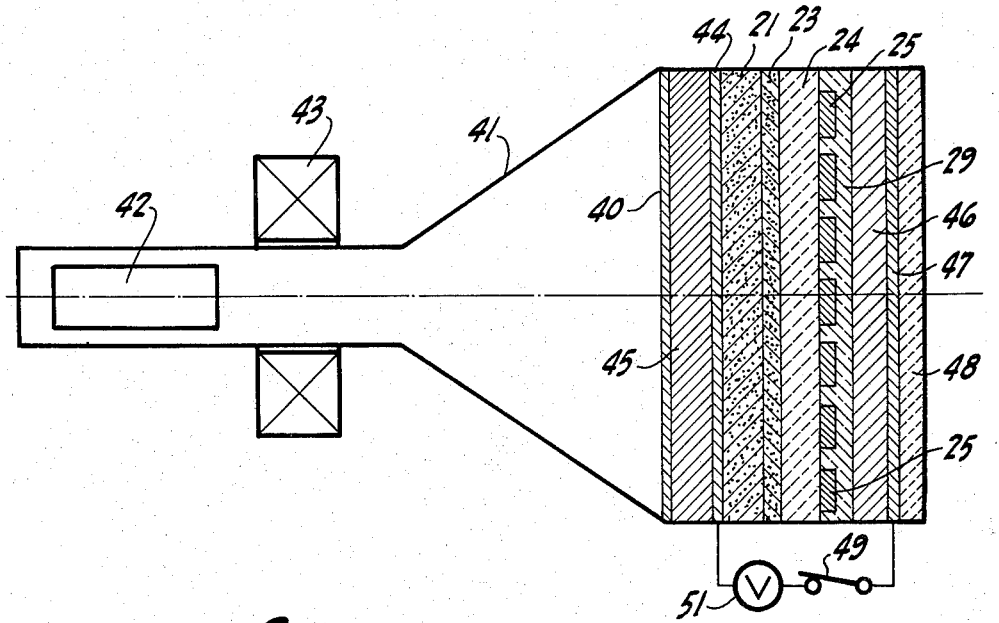
FIG. 6 is a view partly in section of an electrochormatic storage tube incorporating the present invention.

In accordance with another embodiment of the present invention, there is provided a means for exciting and employing such materials. Referring to FIG. 6, there is schematically illustrated an electrochromic storage tube. The tube comprises a vacuum envelope 41 with an electron gun 42 disposed at one end of the envelope and deflecting means 43 disposed adjacent the electron gun. A fibre optics face plate is shown at 45. The inside of the face plate is coated with a suitable phosphor 40, which may be aluminum, and which emits light responsive to impingement of the electron beam. Preferably, the phosphor 40 is selected to emit light near or in the red region of the color spectrum since these wave lengths are capable of penetrating further into silicon.

A transparent conductive coating 44 is applied to the external surface of the fibre optics bundle 45. The coating 44 may, for example, comprise tin oxide. A bistable switching device of the type previously described in connection with FIG. 1 cooperates with the conductive coating 44. The same reference numerals have been applied to like parts. Electrochromic material 46 is applied to the surface of the opaque layer 29. A transparent conductive contact 47, for example, tin oxide, is applied to the electrochromic material. The electrochromic material 46 may be protected by a transparent glass plate 48.

Operation of the electrochromic storage tube starts with closure of switch 49 which applies the d.c. voltage 51 across the display screen between the conductive coatings 44 and 47. Most of the voltage drop is across the silicon elements since they are in the unexcited low conductivity state. The electrochromic film 46 is clear. The electron beam scans the phosphor of the cathode ray tube with its grid modulated in accordance with the information to be displayed. The deflection can be random or raster fashion. When the phosphor 40 is struck by the electron beam, light is transmitted by the fibre optic bundles 45 forming the face plate to the adjacent silicon elements causing them to switch into the high conductivity storage state. The electron beam dwell time for switching the elements can be in the order of microseconds because of the high frequency response of the silicon junction. After the switching elements are switched, most of the voltage drop appears across the adjacent portion of the electrochromic layer 46 and causes it to turn black. Thus, a two-dimensional black and white pattern is produced on the electrochromic layer 46. This pattern corresponds to the information imparted by the electron beam to the phosphor 40. The display will be maintained indefinitely until it is turned off by reversing the voltage 51 applied across the storage screen assembly. The erasure can be complete or partial by adjusting the length of time the field is reversed.

Thus, there has been provided an electro-optical transducer and storage tube capable of storing information for predetermined periods of time with high resolution, high frequency response, and improved display brightness.

We claim:

1. An electro-optical transducer responsive to a projected energy beam comprising a bistable switch having in layered sequence a semiconductor layer, a dielectric barrier layer, and a tunnelling layer; elemental contacts on said bistable switch attached on said tunnelling layer on the side opposite said dielectric barrier layer, said elemental contacts defining areas of said bistable switch for preferential switching; an electrode layer in contact with one side of said bistable switch; means for providing a visual display in response to an electric field of predetermined magnitude applied thereacross formed as a layer on the other side of said bistable switch; an optically transparent conductive coating in contact with said means for providing a visual display; and a transparent face plate adjacent said transparent conductive coating for supporting said means for providing a visual display; so that when an electrical voltage sufficient in magnitude to provide said predetermined electric field magnitude is applied across said electrode and said optically transparent conductive coating and the projected energy beam has sufficient energy and is directed to impinge upon said electrode, said bistable switch is triggered into a high conductance state and the voltage maintains the high conductance state, thereby causing said means for providing a visual display to luminesce and provide an image which corresponds to the points of impingement of the energy beam which has fine definition for sufficiently high density arrays of said elemental contacts, and which is maintained indefinitely until the voltage is removed.

2. An electro-optical transducer as in claim 1 together with an opaque insulating layer between said bistable switch and said means for providing a visual display to minimize feedback of light from the means providing a visual display to the bistable switch.

3. An electro-optical transducer as in claim 1 wherein said bistable switch is oriented so that said semiconductor layer is disposed toward said means for providing a visual display.

4. An electro-optical transducer as in claim 1 wherein said electrode layer is disposed adjacent said semiconductor layer, and wherein said elemental contacts are disposed toward said means for providing a visual display.

5. An electro-optical transducer as in claim 4 for use in an evacuated environment, wherein said means for providing a visual display is an electrochromic layer, and said electrode layer is transparent, together with a fiber optics face plate adjacent to said electrode layer, and a phosphor coating on the side of said fiber optics face plate opposite said electrode layer, whereby when said phosphor coating is struck by the projected energy beam, light is emitted thereby, which is transmitted by said fiber optics face plate to said electrode, and said voltage must be reversed after removal to erase said image.

6. An electro-optical transducer as in claim 1 wherein said semiconductor layer is N type silicon having a thickness such that the depletion layer does not penetrate therethrough, and wherein said bistable switch layers are disposed so that said semiconductor layer is adjacent to said means for providing a visual display, whereby effects from feedback of light from said means for providing a visual display to said semiconductor layer are overcome.

7. An electro-optical transducer as in claim 1 wherein said means for providing a visual display is an electrochromic layer, said electrode layer is transparent, and the projected energy beam is a light beam, whereby a reverse voltage must be applied between said electrode and said optically transparent conductive coating after said voltage is removed to erase said image.

8. A storage tube of the type including an evacuated envelope, an electron gun disposed at one end of said envelope for projecting an electron beam carrying signal, an electro-optical transducer disposed at the other end of said envelope for receiving said beam and being responsive thereto to provide and form a display on a face of said envelope adjacent thereto, said electro-optical transducer comprising, a bistable switch for switching an electrical signal applied on the electron gun side of said electro-optical transducer, a plurality of electrically conductive areas on said bistable switch for application of an electrical potential for causing said bistable switch within the adjacent bistable switch body to transition from a low conductivity to a high conductivity state responsive to signals of predetermined magnitude carried by said electron beam and so that said bistable switch is maintained in said high conductivity state by an electric field of predetermined magnitude resulting from said electrical potential applied thereacross, means for providing a visual display of the type which emits light responsive to an electric field of predetermined magnitude applied thereacross formed as a layer having one face electrically connected with one face of said bistable switch and the other face disposed to emit light at the face of said envelope, contact means applied to the other face of said bistable switch forming an ohmic connection to said other face, and optically transparent contact means applied to the other face of said means for providing a visual display to form ohmic connection thereto, whereby a voltage up to 200 volts can be applied across said bistable switch and said visual display layer, whereby when said selected areas of said bistable switch are in the high conductivity state the applied voltage serves to maintain the high conductivity state so that the electric field between said contact means and said optically transparent contact means is applied primarily across said visual display means to generate bright visible light at said selected areas.

9. A storage tube as in claim 8 wherein said plurality of electrically conductive areas are formed on the one face of said bistable switch, thereby forming a high density array of discrete switches being individually actuated by said electron beam, so that said means for providing a visual display presents an image resolution which is better than that which may be detected by the unaided eye.

10. A storage tube as in claim 9 together with an opaque insulating layer disposed between said plurality of electrically conductive areas and said one face of said means for providing a visual display.

* * * * *